(12) United States Patent
Long (10) Patent No.: US 11,974,566 B2
(45) Date of Patent: May 7, 2024

(54) BOOM SECTION FOR AN AGRICULTURAL MACHINE

(71) Applicant: Exel Industries, Epernay (FR)

(72) Inventor: Greg Long, Clay City, IN (US)

(73) Assignee: Exel Industries, Epernay (FR)

( * ) Notice: Subject to any disclaimer, the term of this patent is extended or adjusted under 35 U.S.C. 154(b) by 484 days.

(21) Appl. No.: 17/028,954

(22) Filed: Sep. 22, 2020

(65) Prior Publication Data

US 2022/0087242 A1 Mar. 24, 2022

(51) Int. Cl.
*A01M 7/00* (2006.01)

(52) U.S. Cl.
CPC ......... *A01M 7/0075* (2013.01); *A01M 7/0078* (2013.01)

(58) Field of Classification Search
CPC .. A01M 7/0075; A01M 7/0078; A01M 7/005; A01M 7/0053; A01M 7/0071; A01M 7/006; B05B 15/658
See application file for complete search history.

(56) References Cited

U.S. PATENT DOCUMENTS

| | | | |
|---|---|---|---|
| 6,042,020 A * | 3/2000 | Weddle | A01M 7/0075 239/164 |
| 6,837,446 B1 | 1/2005 | Jesse | |
| 6,966,501 B2 * | 11/2005 | Wubben | A01M 7/0071 52/646 |
| 7,669,784 B2 | 3/2010 | Sobolik | |
| 9,155,295 B2 | 10/2015 | Bouten | |
| 9,462,799 B2 | 10/2016 | Bouten | |
| 9,807,997 B2 | 11/2017 | Hiddema et al. | |
| 10,258,028 B2 | 4/2019 | Pilney | |
| 10,433,535 B2 | 10/2019 | Hiddema et al. | |
| 10,440,942 B2 | 10/2019 | Barker et al. | |
| 2004/0123549 A1 * | 7/2004 | Coles | E04C 3/291 52/648.1 |
| 2014/0157714 A1 * | 6/2014 | Richardson | E04B 1/1903 52/646 |

(Continued)

OTHER PUBLICATIONS

Agromaster F2000, image retrieved from internet, published at least as early as Feb. 21, 2020 (1 page).

(Continued)

*Primary Examiner* — Tuongminh N Pham
(74) *Attorney, Agent, or Firm* — Maginot, Moore & Beck, LLP (57) ABSTRACT

A boom section for an agricultural sprayer supports a plumbing pipe and a plurality of spray nozzles attached thereto. The boom section includes first and second upper beams, first and second lower beams, and gusset plates. The first and second upper beams and the first and second lower beams define an open interior between the first and second upper beams and the first and second lower beams. The gusset plates are disposed in the open interior, and are coupled to each of the first and second upper beams and first and second lower beams. The gusset plates extending from the first and second upper beams to the first and second lower beams in alternating angles in an interleaved manner. Each of the gusset plates has at least one cutout area defining a void sufficient to receive the plumbing pipe such that the spray nozzles are disposed within the open interior.

18 Claims, 6 Drawing Sheets

(56) References Cited

U.S. PATENT DOCUMENTS

2016/0262371 A1* 9/2016 Hiddema ............ A01M 7/0067

OTHER PUBLICATIONS

Apache Model AS1240 XP Sprayer, Specification Sheet, 2019 (2 pages).
Chafer Sentry 5000, image retrieved from internet, published at least as early as Feb. 21, 2020 (1 page).
China Agricultural Self-Propelled Sprayer, image retrieved from internet, published at least as early as Feb. 21, 2020 (1 page).
Gaber Distributors, Pommier Spray Booms, Feb. 25, 2020, available at www.gaberdistributors.com/page/pommier (3 pages).
Hardi Rubicon 9000, image retrieved from internet, published at least as early as Feb. 21, 2020 (1 page).
Househam Spirit, image retrieved from alibaba.com with no model info, published at least as early as Feb. 21, 2020 (1 page).
New Holland Guardian SP310F, image retrieved from internet, published at least as early as Feb. 21, 2020 (1 page).
2018 New Holland Agriculture Guardian Rear Boom Sprayer—Tier 4B SP.300C, image retrieved from internet, published at least as early as Feb. 21, 2020 (1 page).
Pommier-America, Hydraulic Breakaway Kit & Last Section, image of webpage, published at least as early as Nov. 5, 2019, available at www.pommier-america.com/en/produit/hydraulic-breakaway-kit-last-section-31.html (1 page).

\* cited by examiner

BOOM SECTION FOR AN AGRICULTURAL MACHINE

BACKGROUND

A crop sprayer is a piece of agricultural equipment that is used to apply herbicides, fertilizers and pesticides on agricultural crops. Crop sprayers range in size from man-portable units to trailed sprayers that are connected to a tractor, to self-propelled units. A self-propelled crop sprayer is a vehicle, similar to a tractor, with booms that allow for a broad application of spray liquid. The mounted booms can be up to 30-80 feet in length depending on engineering design for tractor and land size. The booms generally extend laterally from the vehicle such that a swath of land of 60-160 feet may be sprayed.

In order to store self-propelled sprayers or even trailed sprayers, the booms are often designed to collapse and rotate to extend parallel to the length of the vehicle when not in use. For example, the Apache AS1240XP sprayer available from ET Works LLC of Mooresville, IN, can be outfitted with booms of 120' in length which collapse roughly in half (via a hinged connection between two boom sections), and then rotate via another hinged connection to extend along the length of the vehicle. Such configurations of sprayer booms are ubiquitous throughout the industry.

A challenge with crop sprayers is handling uneven terrain. For example, a crop sprayer can have 100' booms that extend only a few feet off of the ground. Under these conditions, a relatively modest bump can tilt the boom sufficiently to encounter the ground at its furthest extent. Accordingly, it is not uncommon for a crop sprayer to have a trip/breakaway mechanism that allows a part of the boom to partly collapse (i.e. trip or breakaway) without permanent damage to the boom and spray equipment. Many trip mechanisms are biased to recover once the obstacle is cleared. Even with such trip mechanisms, however, spray nozzles can be damaged by impact with the ground or other obstacles such as fence posts.

Another issue with spray nozzles in many sprayer designs is that it can be relatively difficult to change the arrangement of spray nozzles on the booms. The proper configuration of spray nozzles can depend on crop row spacing, weather and other variables. Thus, for an end user, it can be useful to be able to change the distance between and/or attitude of spray nozzles on the boom. However, changing positions of the nozzles can be difficult and time consuming for the user.

In addition, it is readily apparent that larger booms are desirable because they can cover more ground with a single pass of the sprayer. However, larger booms represent a longer cantilevered design, and as such there is a practical limit to boom length. The lightest booms that extend the longest are made primarily of aluminum. However, aluminum booms can suffer strength issues.

Accordingly, there is a need to address one or more issues with prior art booms, preferably allowing longer booms and booms with a more flexible design.

SUMMARY OF THE INVENTION

At least some of the embodiments described herein address the above-stated need, as well as others, by providing at least one boom section for use in an agricultural machine having gusset plates affixed between upper and lower rails or beams. The rails or beams define an interior in which plumbing pipes and spray nozzles are disposed.

A first embodiment is a boom section for an agricultural sprayer configured to support a plumbing pipe and a plurality of spray nozzles attached thereto. The boom section includes first and second upper beams extending substantially along a boom length direction, first and second lower beams extending substantially along the boom length direction, and gusset plates. The first and second upper beams and the first and second lower beams define an open interior between the first and second upper beams and the first and second lower beams. The gusset plates are disposed in the open interior, and are coupled to each of the first and second upper beams and first and second lower beams. The gusset plates extending from the first and second upper beams to the first and second lower beams in alternating angles in an interleaved manner. Each of the gusset plates has at least one cutout area defining a void sufficient to receive the plumbing pipe such that the spray nozzles are disposed within the open interior.

The above-described features and advantages, as well as others, will become more readily apparent to those of ordinary skill in the art by reference to the following detailed description and accompanying drawings.

DETAILED DESCRIPTION

Figure 1:
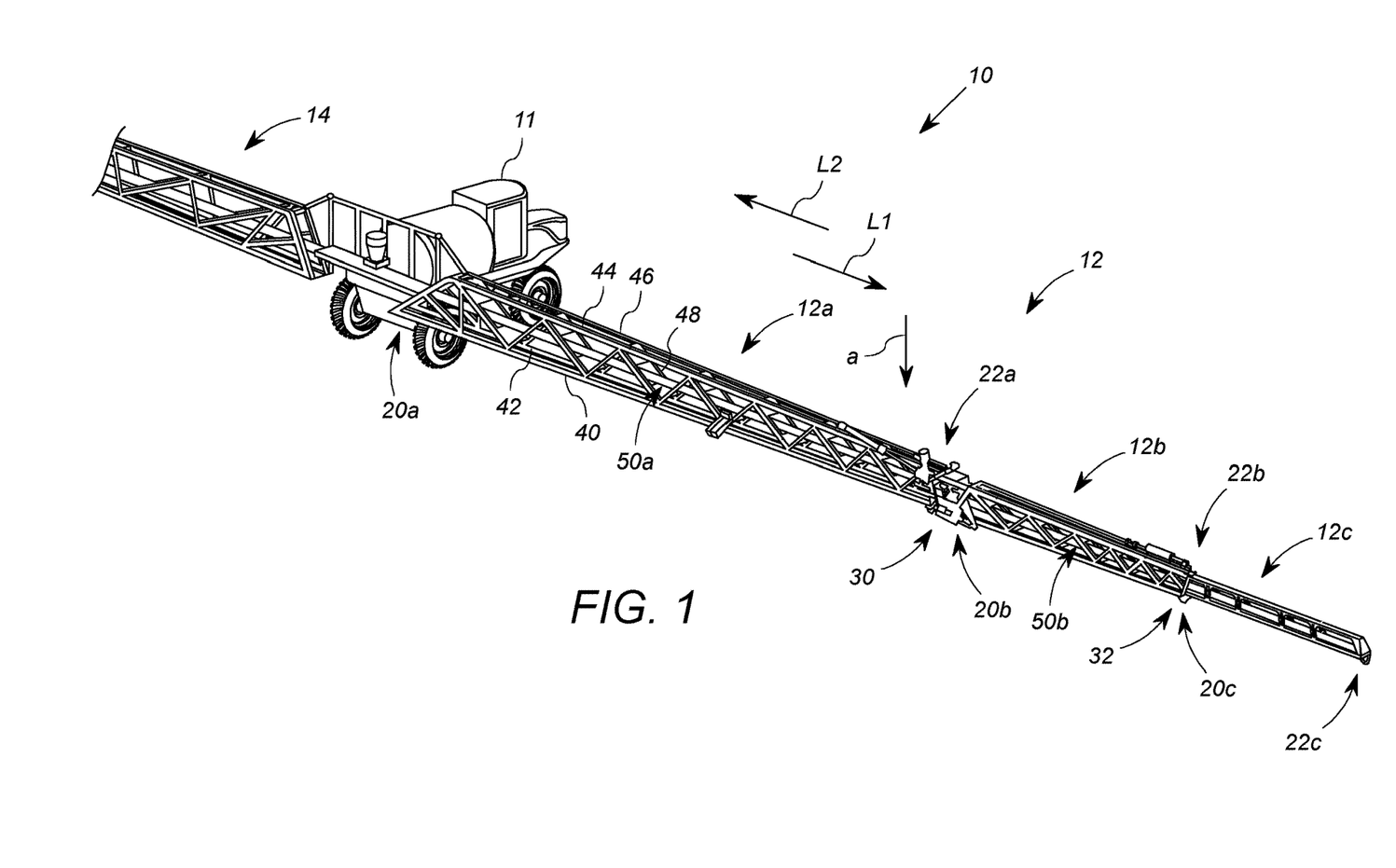
FIG. 1 shows a fragmentary perspective view of an agricultural machine incorporating boom segments according to a first embodiment herein.
Figure 5:
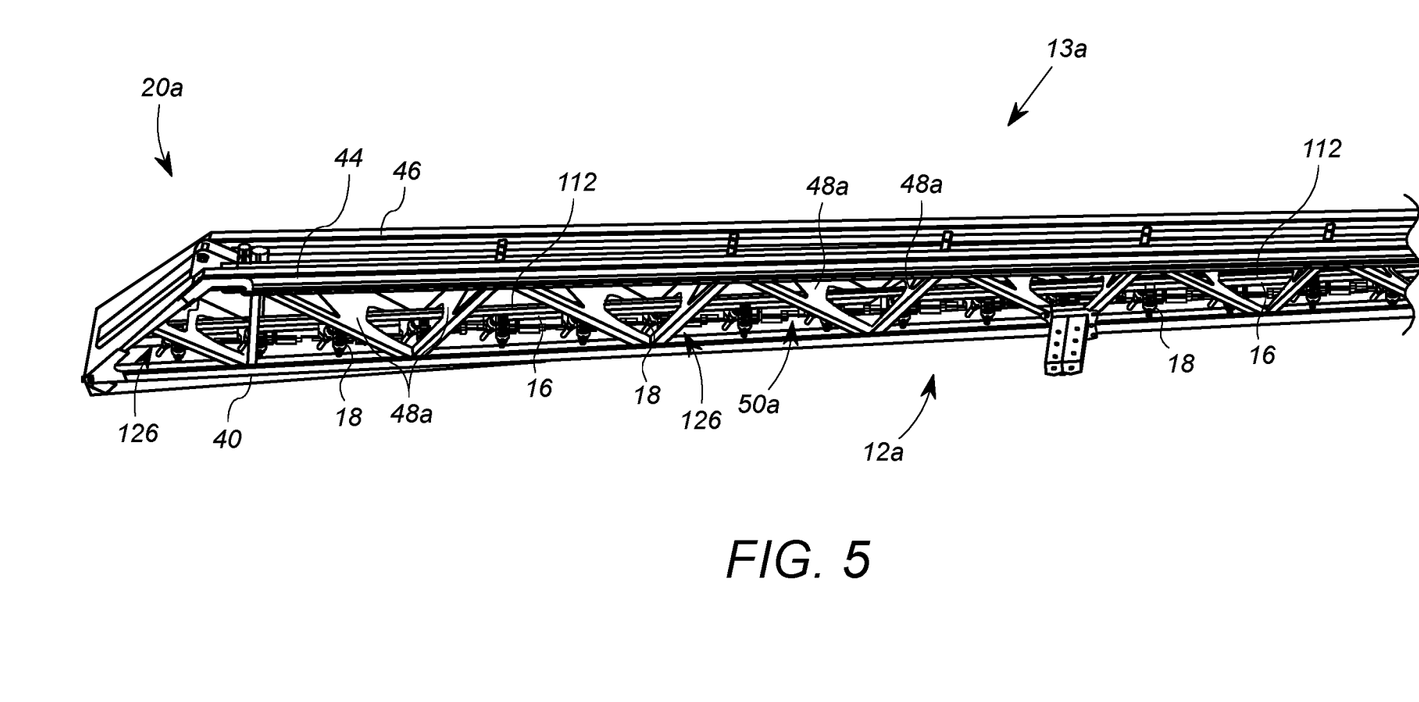
FIG. 5 shows a perspective view of a boom section assembly that incorporates the boom section of FIG. 4.
Figure 6:
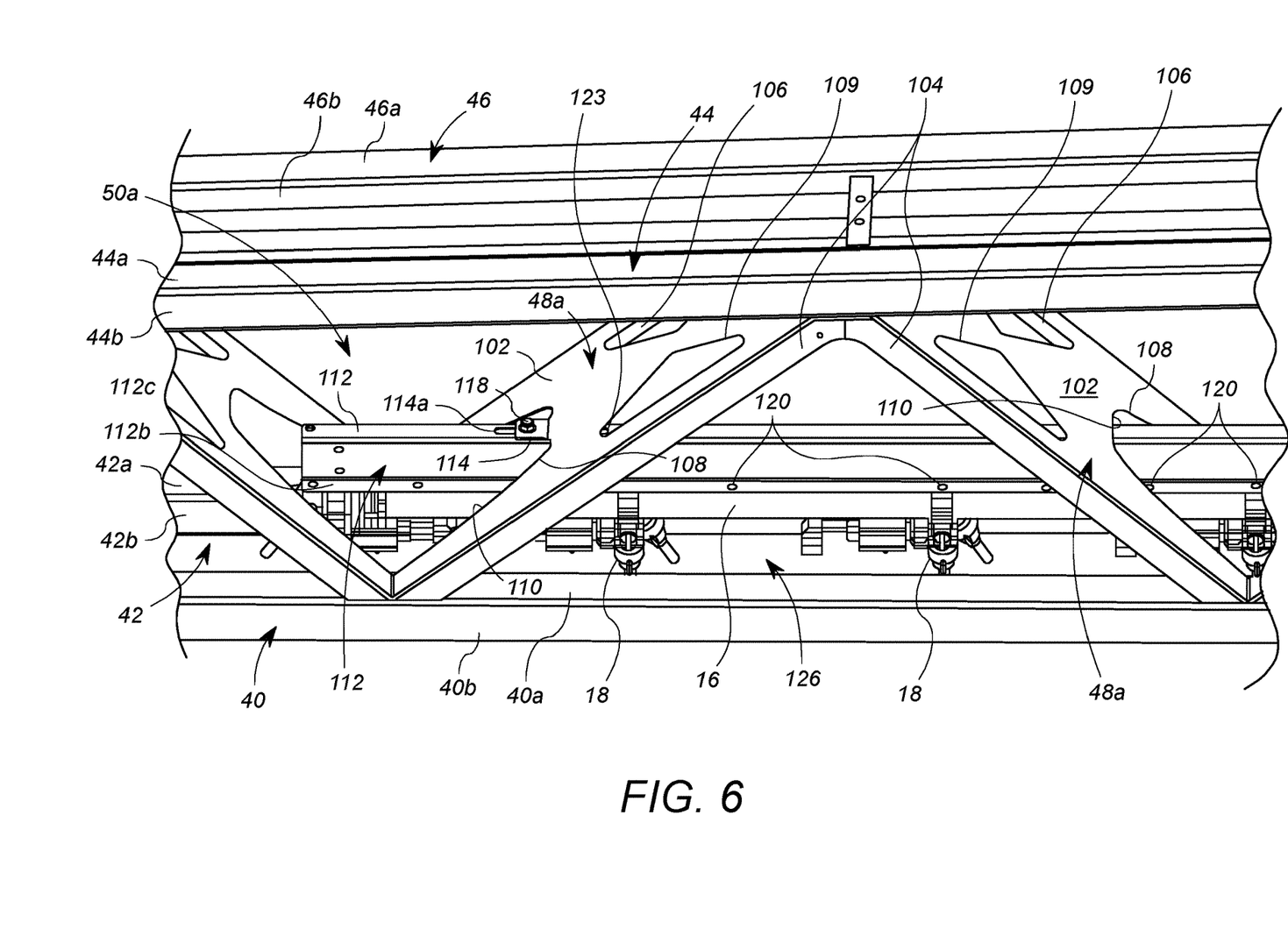
FIG. 6 shows an enlarged fragmentary perspective view of the boom section assembly of FIG. 5.

FIG. 1 shows a fragmentary, perspective view of an agricultural machine 10 having a vehicle 11, a first boom 12 and a second boom 14, according to a first embodiment. The second boom 14 is shown in fragment, but has the same general structure as the first boom 12. The agricultural machine 10 is configured to spray crops with liquids. The first boom 12 is divided into three foldable boom segments 12a, 12b, and 12c. Although not shown in FIG. 1 for clarity of exposition, disposed within the first boom 12 is a plumbing conduit and a plurality of downward facing spray nozzle assemblies operably coupled to the plumbing conduit. The spray nozzles are spaced apart along the plumbing conduit, which is formed of multiple connected segments, over substantially the entire length of the first boom 12. FIGS. 5 and 6, discussed further below, show portions of plumbing conduit segments 16 and spray nozzle assemblies 18 disposed within the inner boom segment 12a. It will be understood, however, that the details of the plumbing conduit and spray nozzle assemblies may take any suitable form.

Figure 2:
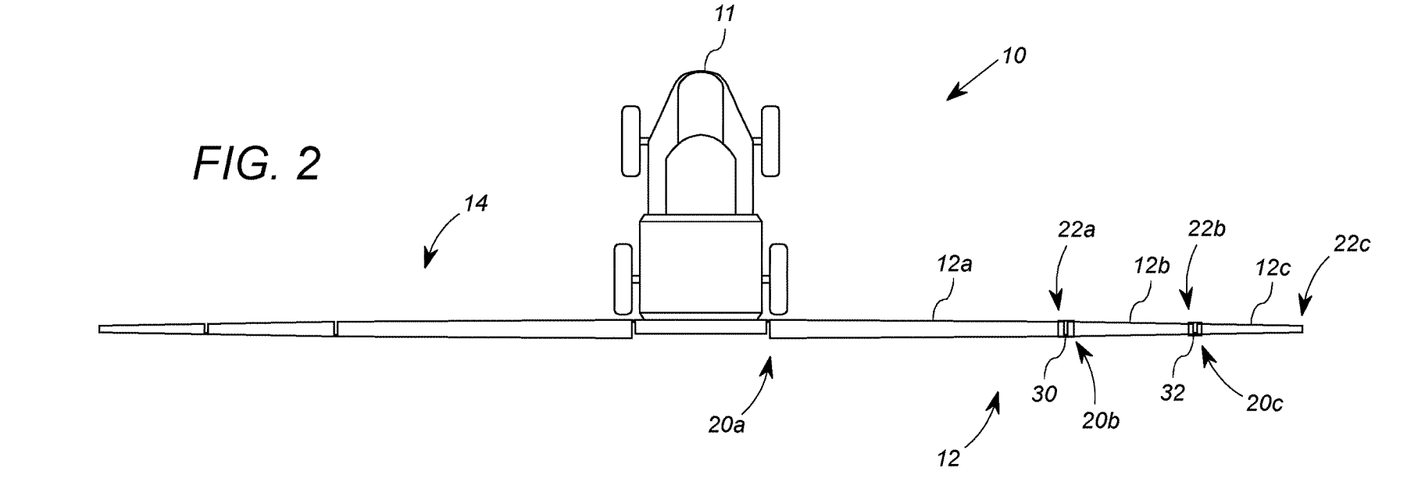
FIG. 2 shows a top schematic view of the agricultural machine of FIG. 1 with booms in normal, extended position for use in spraying.
Figure 3:
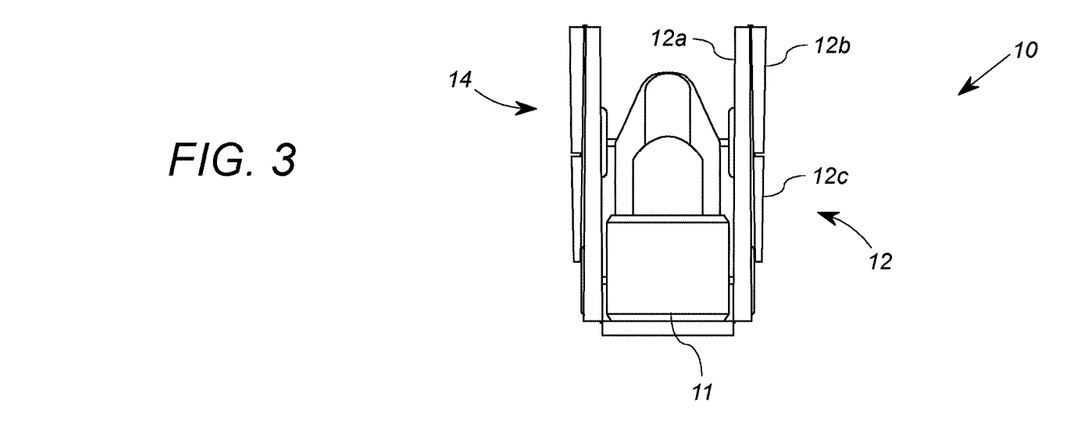
FIG. 3 shows a top schematic view of the agricultural machine of FIG. 1 with booms in a normal, retracted position for storage and transport.

Referring again to FIG. 1, the booms 12 and 14 have an extended configuration or position for spraying use and a retracted or folded position for storage, as well as travel to and from the field to be sprayed. FIG. 1 shows the booms 12 and 14 in the extended position. Likewise, FIG. 2 shows a top schematic view of the agricultural machine 10 with the booms 12 and 14 in the extended position. FIG. 3, however, shows a top schematic view of the agricultural machine 10 with the booms 12 and 14 in the retracted or folded position. The retracted configuration shown in FIG. 3 makes the agricultural machine easier to store, and facilitates travel of the vehicle 11 when the machine 10 is not spraying.

The boom 12 is described in further detail with reference to FIGS. 1 to 3. It will be understood that the boom 14 the same structure in mirror image. In the use (i.e. spraying) position, all three segments 12a, 12b, and 12c in the extended position extend generally perpendicular to the direction of the travel of the vehicle 11. This perpendicular direction is referred to as the lateral direction. With reference to the boom 12, the direction away from the vehicle is defined as the laterally outward direction L1, and the opposite direction is defined as the laterally inward direction L2. In such position, the lateral direction is also the boom length direction, and the horizontally perpendicular direction is referred to as the boom width direction.

The inner segment 12a has a first end 20a operably coupled to and proximate to the vehicle 11, and a second end 22a. The intermediate segment 12b has a first end 20b operably coupled to and proximate to the second end 22a of the inner segment 12a, and a second end 22b. The outer segment 12c has a first end 20c operably coupled to and proximate to the second end 22b of the intermediate segment 12b, and a second end 22c. The length from the first end 20a of the inner segment 12a to the second end 22c of the outer segment 12c in the extended configuration of FIG. 1 defines the length of the boom 12.

As shown in FIG. 3, in the retracted configuration the segments 12a, 12b, 12c extend generally alongside the vehicle 11 and generally parallel to the direction of travel. To this end, the segments 12a and 12b have pivotal connections to allow the segments 12a, 12b and 12c to fold toward the retracted position. As shown in FIG. 3, the boom 14 is similarly retracted.

With specific reference to the boom 12, the first end 20a of the segment 12a is pivotally connected to the vehicle 11 such that the boom segment can rotate about a substantially vertical fold axis from the extended configuration to the retracted configuration. The first end 20b of the intermediate segment 12b is operably pivotally connected to the second end 22a of the inner segment 12a to rotate about a substantially vertical fold axis α. The first end 20c of the outer segment 12c is operably connected to the second end 22b of the intermediate segment 12b, but is not configured to pivot to another position in the retracted position. As shown in FIGS. 1 and 2, the position of the outer segment 12c with respect to the intermediate segment 12b does not change in the extended and retracted configurations.

The vehicle 11 contains hydraulic circuitry, not shown in detail, but which can take many forms known in the art, that controllably rotates the intermediate segment 12b between the retracted and extend configuration, controllably rotates the inner segment 12a between the retracted and extended configuration, and controllably retracts and extends segments of the boom 14 in the same manner. The hydraulic circuitry may suitably be controlled by the operator of the machine 10.

The intermediate boom segment 12b may also suitably be coupled to the inner boom segment 12a via a first breakaway system 30. Similarly, the outer boom segment 12c is operably coupled to the intermediate boom segment 12b via a second breakaway system 32. Each of the breakaway systems 30, 32 is configured to independently trip (or breakaway) responsive to encountering an obstacle or a terrain feature.

Various features the boom sections 12a, 12b, 12c provide for convenience in both manufacturing and use, and facilitate wider wingspans. Such features are described below in connection with FIGS. 4-7 as they are embodied on the inner boom section 12a.

Figure 4:
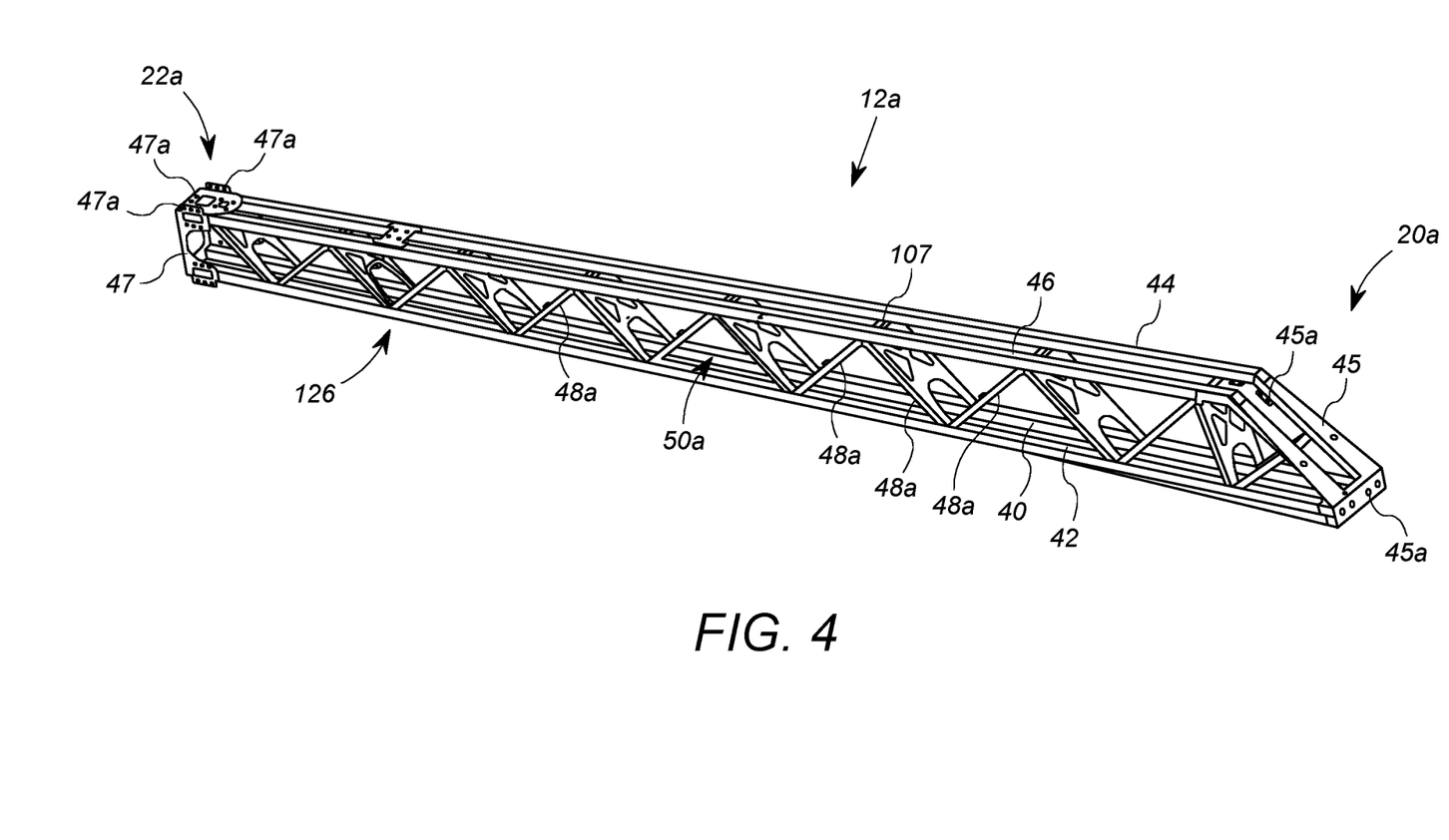
FIG. 4 shows a perspective view of a boom section that may be used in the agricultural machine of FIG. 1.

In particular, FIG. 4 shows in further detail a perspective view of the inner boom section 12a apart from the other elements of the agricultural machine 10. FIG. 5 shows a perspective view of the inner boom section assembly 13a that includes the inner boom section 12a with the plumbing pipes 16 and spray nozzles 18 assembled thereto via an interface beam 112. With reference to FIGS. 4 and 5, the inner boom section 12a includes first and second lower beams 40, 42, respectively, and first and second upper beams 44, 46, respectively, extending substantially along the boom length direction (i.e. the laterally outward direction in use as shown in FIGS. 1 and 2). The inner boom section 12a also includes end plates 45, 47. The end plate 45 is disposed at the first end 20a and extends at an angle from the upper beams 44, 46 to the lower beams 40, 42. The end plate 45 may have one or more structures, including through-holes 45a for receiving fasteners, not shown, that connect the inner boom section 12a to the vehicle 11. The end plate 47 is disposed at the second end 22a and extends largely vertically from the upper beams 44, 46 to the lower beams 40, 42. The end plate 47 may have one or more structures, including through-holes 47a for receiving fasteners, not shown, that connect the inner boom section 12a to the intermediate boom section 12b, including but not limited to the first brake assembly 30.

The beams 40, 42, 44 and 46 extend nearly parallel, but slightly taper toward each other as they extend from the first end 20a to the second end 22a. The first and second lower beams 40, 42 and the first and second upper beams 44, 46 define an open interior 50a therebetween. The beams 40, 42, 44 and 46 define the four corners of the interior 50a.

As shown in FIGS. 4 and 5, the inner boom section 12 further comprises a plurality of gusset plates 48a disposed in the open interior 50a. Each of the gusset plates 48a is coupled to each of the first and second lower beams 40, 42 and first and second upper 44, 46. The gusset plates 48a extend from the first and second upper beams 44, 46 to the first and second lower beams 40, 42 in alternating angles in an interleaved manner, such that they form a zig-zag or repeating triangle pattern along the boom length direction. Each of the gusset plates 48a has at least one cutout area defining a void sufficient to receive the plumbing pipe 16 such that the spray nozzles 18 are disposed within the open interior 50a. (See FIG. 5).

In particular, FIG. 6 shows an enlarged fragmentary perspective view of the inner boom assembly 13a of FIG. 5. Each of the beams 40, 42, 44 and 46 in this embodiment is metal (e.g. steel) tube having a square cross-section. For example, the lower beam 40 includes an upper side 40a, an outer side 40b, and inner and lower side, not visible in FIG. 6, but having the same dimensions. Adjacent sides are joined at corresponding edges thereof at a perpendicular angle, which may be rounded or chamfered. For example, the upper side 40a and outer 40b are joined at corner 40c. The beam 42 has a similar structure, including inner side 42a, upper side 42b, and outer and lower sides not visible in FIG. 6. The beam 44 similarly includes top side 44a, outer side 44b and two opposite sides not visible in FIG. 6, and the beam 46 includes upper side 46a, inner side 46b, and two opposite sides not visible in FIG. 6.

As best seen in FIG. 6, each of the gusset plates 48a includes a main plate 102, a first flange 104, a second flange 106 and a mounting bracket 114. The main plate 102 is nominally rectangular, and is sized to fit and extend at an angle between and the beams 40, 42, 44 and 46. The main plate 102 has a bottom cutout 108 that defines a void 110. The first flange 104 extends up one inclined edge of the main plate 102, and the second flange 106 extends up the other inclined edge of the main plate 102. The first and second flanges 104, 106 extend perpendicular to the main plate 102 to provide strengthening. The flange 104 extends between and engages the top side 40a of the beam 40 and the bottom side (not shown) of the beam 44. The flange 106 extends between and engages the top side 42b of the beam 42 and the bottom side (not shown) of the beam 46. The mounting bracket 114 is a short bar extending along the boom length direction from the main plate 102 at the cutout 108. The mounting bracket 114 includes a plurality of holes 114a for receiving fasteners. In this embodiment, the main plate 102 has interior cutouts 109 that serve to remove weight and material from the gusset plate 48a without sacrificing much strength. The overall design and layout of the gusset plates 48a enable the construction of longer beams with reduced overall weight and sufficient strength.

Figures 7, 8:
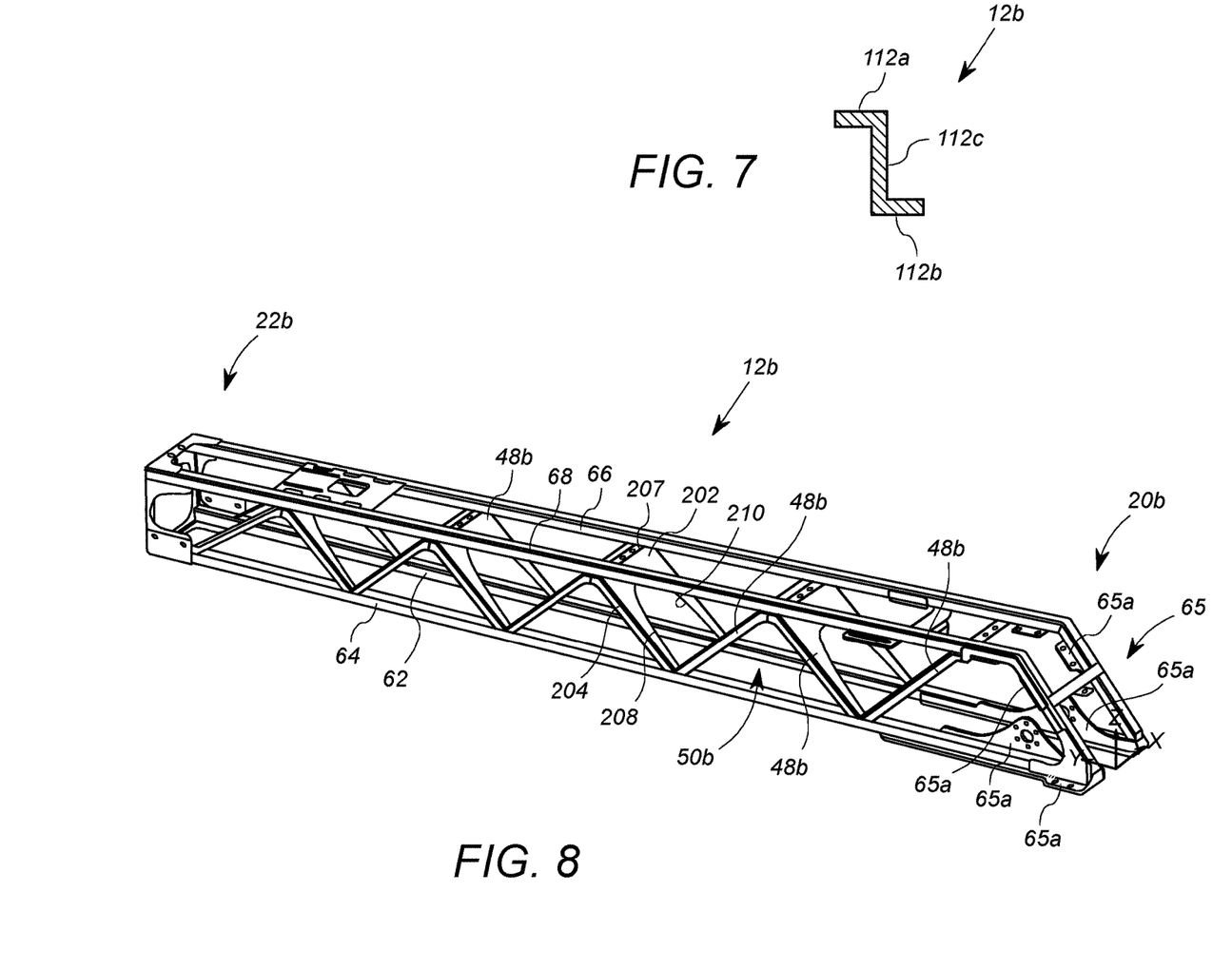
FIG. 7 shows a cross-sectional view of an interface beam of the boom section assembly of FIG. 5.
FIG. 8 shows a perspective view of a second exemplary boom section that may be used in the agricultural machine of FIG. 1.

As shown in FIG. 6, the interface beam 112 includes a top bar 112a, a bottom bar 112b, and an intermediate bar 112c. The interface beam 112 extends through the voids 110 of the plurality of gusset plates 48a. FIG. 7 shows a cross-section of the interface beam 112 alone. With reference to FIGS. 6 and 7, the top bar 112a may suitably be a flat bar, and in any event is secured to the mounting bracket 114 of the gusset plate 48a via fastener 118. The lower beam 112b is also a flat bar, and has a plurality of attachment throughholes 120 for attaching the plumbing pipe 16. The intermediate bar 112c couples to the top bar 112a and bottom bar 112b and preferably provides a vertical spacing therebetween. The intermediate bar 112c in this embodiment is a vertical flat bar, and the interface beam 112 is configured as a metal Z-beam. Such a configuration efficiently allocates surface space for throughholes 120 on the bottom bar 112b and for the corresponding throughholes or slots 123, in the top bar 112a.

The spray nozzle assemblies 18 are supported by, and in fluid connection with the plumbing conduit section or pipe 16. As discussed above, the plumbing pipe 16 is a section of pipe with several spray nozzle assemblies 18 affixed thereto. As shown in FIG. 5, the inner boom assembly 13a includes at least two plumbing pipes 16 coupled in fluid connection with each other. The plumbing pipes 16 are operably coupled and configured to convey liquid from tanks, not shown, on the vehicle 11 (see FIG. 10) to the spray nozzle assemblies 18. Each of the spray nozzle assemblies 18 includes one or more nozzles configured to convey liquid received from the plumbing pipe 16 into a spray pattern. Suitable spray nozzle assemblies are known in the art.

It will be appreciated that the lower beams 40, 42 of the inner boom section 12a are spaced apart in the boom width direction, cooperating with the voids 110 in the gusset plates 48a to define an elongate open bottom 126 in the inner beam section 12a. The distance between the first lower beam 40 and the second lower beam 42 is greater than a cross-width of the plumbing pipe 16 and spray nozzle assemblies 18 assembled together. Moreover, the open bottom 126 has a length at least as long as the plumbing pipe 16. As a result, no interference exists to insertion of the plumbing pipe 16 (and spray nozzle assemblies) from the beneath the boom section 12a into the voids 110 of the gusset plates 48a. As a consequence, the open bottom 126 provides accessibility from beneath the inner boom 12a for installation and/or removal of the interface beam 112, the plumbing pipe 16 and spray nozzle assemblies 18. Such accessibility provides for flexibility in spray nozzle configurations.

To this end, the interface beam 112 may be outfitted with plumbing pipes 16 having any of a plurality of spray nozzle assembly configurations. Different spraying applications, crop row spacing, and/or weather conditions may dictate different spray nozzle spacing (or other configuration). If a change in nozzle configuration is required, then the interface beam 112 with a first plumbing pipe 16 having a first spray nozzle configuration may be removed through the open bottom 126, and then replaced with another interface beam (via the open bottom 126) having a second plumbing pipe, not shown, which has a different spray nozzle spacing. Alternatively, the interface beam 112 may be removed from the inner boom section 12a (from below), and then the plumbing pipe 16 can be replaced on the interface beam 112 with a different plumbing pipe having different spray nozzle spacing. The interface beam 112 with the different spray nozzle configuration can then be re-inserted through the open bottom 126 and mounted to the mounts 114 of the gusset plates 48a.

It will also be appreciated that the inner beam section 12a is symmetrical about the vertical plane in the boom length direction. This includes the end plates 45, 47 and the fastener holes 45a, 47a. The gusset plates 48a are also symmetrical, including the shape of the voids 110. This symmetrical design allows the same inner beam section 12a to be used as both on the boom 12 and on the boom 14, thereby increasing manufacturing efficiency and replacement part inventory. In other words, the inner beam section 12a may be reversed without changing its relevant structure or functional advantages.

FIG. 8 shows a perspective view of another example of a boom section, which in this case may be used as the intermediate boom section 12b of the agricultural machine 10 of FIG. 1. The intermediate boom section 12b includes first and second lower beams 62, 64, respectively, and first and second upper beams 66, 68, respectively, extending substantially along the boom length direction (i.e. the laterally outward direction L1 when the boom 12 is in use position as shown in FIGS. 1 and 2).

The beams 62, 64, 66 and 68 extend nearly parallel, but slightly taper toward each other as they extend from the first end 20b to the second end 22b. The first and second lower beams 62, 64 and the first and second upper beams 66, 68 define an open interior 50b therebetween. Similar to the beams 40, 42, 44 and 46 of the inner beam section 12a, the beams 62, 64, 66 and 68 define the four corners of the interior 50b. Each of the beams 62, 64, 66 and 68 comprises a square tube, similar to the beams 40, 42, 44 and 46.

As shown in FIG. 8, the intermediate boom section 12b further comprises a plurality of gusset plates 48b disposed in the open interior 50b. Each of the gusset plates 48b is coupled to each of the first and second lower beams 62, 64 and first and second upper 66, 68. The gusset plates 48a extend from the first and second upper beams 66, 68 to the first and second lower beams 62, 64 in alternating angles in an interleaved manner, such that they form a zig-zag or repeating triangle pattern along the boom length direction. Each of the gusset plates 48b has at least one cutout area 208 defining a void 210 sufficient to receive one or more sections of plumbing pipe 16 such that the spray nozzles 18 are disposed within the open interior 50b.

It will be appreciated that the intermediate boom section 12b is configured to receive an interface beam similar to interface beam 112, and one or more plumbing pipes 16 with spray nozzle assemblies 18, not shown in FIG. 8.

To this end, each of the gusset plates 48b includes a main plate 202, a first flange 204 and a second flange, not visible but substantially similar to the first flange 204. The main plate 202 is nominally rectangular, and is sized to fit and extend at an angle between and the beams 62, 64, 66, and 68. The first flange 204 extends up one inclined edge of the main plate 202, and the second flange 206 extends up the other inclined edge of the main plate 202. The first and second flanges 204, 206 extend perpendicular to the main plate 102 to provide strengthening. A top flange 207 extends across the top of the main plate 202 from the beam 66 to the beam 68.

Although not shown, at least some of the gusset plates 48b have mounting brackets suitable for mounting an interface beam having the structure of the interface beam 112 of FIGS. 6 and 7 on which plumbing pipes 16 and spray nozzle assemblies 18 are mounted.

Accordingly, the gusset plates 48b are similar in structure and function to the gusset plates 48a. However, the gusset plates 48b are smaller than the gusset plates 48a, and thus the weight and material reducing cutouts 109 of the gusset plates 48a are omitted from the gusset plates 48b.

Like the inner boom section 12a, it will be appreciated that the lower beams 62, 64 of the intermediate boom section 12b are spaced apart in the boom width direction, defining an elongate open bottom 226 in the intermediate beam section 12b. The open bottom 226 has a length at least as long as the plumbing pipe 16. The open bottom 226 thereby provides accessibility from beneath the inner boom 12b for installation and/or removal of the interface beam 112, the plumbing pipe 16 and spray nozzle assemblies 18.

Similar to the inner boom section 12a, the intermediate boom section also includes a cap structure 65 and an end plate 67. The cap structure 65 is disposed at the first end 20b, and includes bars that extend at a downward angle from the upper beams 66, 68 to the lower beams 62, 64. The cap structure 65 may have at least first and second pairs of symmetrically configured and located flanges 65a that include through-holes for receiving fasteners, not shown, that connect (at least indirectly) to the inner boom section 12a. The end plate 67 is disposed at the second end 22b and extends largely vertically from the upper beams 66, 68 to the lower beams 62, 64. The end plate 67 may have one or more structures, including through-holes 67a for receiving fasteners, not shown, that connect to the intermediate boom section 12b.

It will also be appreciated that the intermediate beam section 12b is similarly symmetrical about the vertical plane in the boom length direction. This includes the cap structure 65 and end plate 67, including the pairs of flanges 65a and the fastener holes 67a. It will be appreciated that in many cases, only one of each pair of flanges 65a may be used when the intermediate beam section 12b is mounted, as the other of each pair is provided for allowing the section 12b to be mounted on the opposite beam 14. The gusset plates 48b are also symmetrical, including the shape of the voids 210. This symmetrical design allows the same intermediate beam section 12b to be used both on the boom 12 and on the boom 14, thereby increasing manufacturing efficiency and replacement part inventory.

With reference to FIG. 1, it will be appreciated that the outer boom section 12c may suitably have an analogous open bottom and symmetrical design.

Another feature of each of the boom sections 12a, 12b of this embodiment is the use of at least four beams (e.g. 40, 42, 44 and 46) to define the respective interiors 50a, 50b that contain the spray nozzles assemblies 18. It will be appreciated that during spraying, the booms 12 and 14 can encounter obstacles, or uneven terrain, that can lead to an objection striking in the location of the spray nozzle assemblies 18. The use of four beams protects the nozzle assemblies 18 from impact from external obstacles or the ground from multiple directions and angles.

The gusset plate design used in the boom 12 strengthens the beam to allow for a lighter material to be used on the boom sections 12a, 12b, and 12c.

It will be appreciated that the above-described embodiments are merely exemplary, and that those of ordinary skill in the art may readily devise their own implementations and modifications that incorporate the principles of the present invention and fall within the spirit and scope thereof.

What is claimed is:

1. A boom section for an agricultural sprayer configured to support a plumbing pipe and a plurality of spray nozzles attached thereto, the boom section comprising:
    first and second upper beams extending substantially along a boom length direction, and first and second lower beams extending substantially along the boom length direction, the first and second upper beams and the first and second lower beams defining an open interior between the first and second upper beams and the first and second lower beams;
    a plurality of gusset plates disposed in the open interior, each of the gusset plates coupled to each of the first and second upper beams and first and second lower beams, the gusset plates extending from the first and second upper beams to the first and second lower beams in alternating angles in an interleaved manner, each of the gusset plates having at least one cutout area defining a void sufficient to receive the plumbing pipe such that the spray nozzles are disposed within the open interior;
    an interface beam operably coupled to and extending through the voids of the plurality of gusset plates, the interface beam having a plurality of attachment throughholes for attaching the plumbing pipe thereto; and wherein the attachment throughholes for attaching to the plumbing pipe are disposed below a coupling of the interface beam to the gusset plate.

2. The boom section of claim 1, wherein the interface beam is a Z-beam.

3. The boom section of claim 1, wherein a distance between the first lower beam and the second lower beam is more than a cross-width of the plumbing pipe and spray nozzles.

4. The boom section of claim 1, wherein the first upper beam and the first lower beam are arranged symmetrically to the second upper beam the and second lower beam with respect to a plane defined by the boom length direction and a vertical direction.

5. The boom section of claim 1, further comprising a first end cap coupled to and extending over ends of the first and second upper beams and first and second lower beams, the first end cap including at least a first coupling flange and at least a second coupling flange arranged symmetrically to each other with respect to the plane defined by the boom length direction and a vertical direction.

6. The boom section of claim 1, wherein the first upper beam and the second upper beam have L-shaped cross-sections.

7. A boom section for an agricultural sprayer, the boom section comprising:
first and second upper beams extending substantially along a boom length direction, and first and second lower beams extending substantially along the boom length direction, the first and second upper beams and the first and second lower beams defining an open interior between the first and second upper beams and the first and second lower beans;
a plumbing pipe and a plurality of spray nozzles supported by one or more of the first and second upper beams and the first and second lower beams;
a plurality of gusset plates disposed in the open interior, each of the gusset plates coupled to each of the first and second upper beams and first and second lower beams, the gusset plates extending from the first and second upper beams to the first and second lower beams in alternating angles in an interleaved manner, each of the gusset plates having at least one cutout area defining a void sufficient to receive the plumbing pipe such that the spray nozzles are disposed within the open interior;
a first end cap coupled to and extending over ends of the first and second upper beams and first and second lower beams, the first end cap including at least a first coupling flange and at least a second coupling flange arranged symmetrically to each other with respect to the plane defined by the boom length direction and a vertical direction, the first and second coupling flanges including openings configured to receive fasteners to couple to a second boom section; and
a first bar operably coupled to and extending through the voids of the plurality of gusset plates, and a second bar, the plubming pipe mounted to the second bar, the second bar operably coupled to and disposed below the first bar, and the second bar extending through the voids of the plurality of gusset plates.

8. The boom section of claim 7, wherein a distance between the first lower beam and the second lower beam is more than a cross-width of the plumbing pipe and spray nozzles.

9. The boom section of claim 7, wherein the first upper beam and the first lower beam are arranged symmetrically to the second upper beam the and second lower beam with respect to a plane defined by the boom length direction and a vertical direction.

10. The boom section of claim 1, wherein a top of the interface beam is coupled the plurality of gusset plates.

11. The boom section of claim 10, wherein the top of the interface beam includes a second plurality of attachment throughholes for attaching to the plurality of gusset plates.

12. The boom section of claim 1 wherein the plurality of attachment throughholes for attaching to the plumbing pipe extend through a bottom bar of the interface beam.

13. A boom section of an agricultural sprayer configured to support a plumbing pipe and a plurality of spray nozzles attached thereto, the boom section comprising:
first and second upper beams extending substantially along a boom length direction, and first and second lower beams extending substantially along the boom length direction, the first and second upper beams and the first and second lower beams defining an open interior between the first and second upper beams and the first and second lower beams;
a plurality of gusset plates disposed in the open interior, each of the gusset plates coupled to each of the first and second upper beams and first and second lower beams, the gusset plates extending from the first and second upper beams to the first and second lower beams in alternating angles in an interleaved manner, each of the gusset plates having at least one cutout area defining a void sufficient to receive the plumbing pipe such that the spray nozzles are disposed within the open interior; and
a first bar operably coupled to and extending through the voids of the plurality of gusset plates, a second bar having a plurality of attachment throughholes for attaching the plumbing pipe thereto, the second bar operably coupled to and disposed below the first bar, and the second bar extending through the voids of the plurality of gusset plates.

14. The boom second of claim 13, wherein the first bar is coupled to the second bar by a third bar.

15. The boom section of claim 14, wherein the first bar, the second, and the third bar form a Z-beam.

16. The boom section of claim 13, wherein a distance between the first lower beam and the second lower beam is more than a cross-width of the plumbing pipe and spray nozzles.

17. The boom section of claim 13, wherein the first upper beam and the first lower beam are arranged symmetrically to the second upper beam the and second lower beam with respect to a plane defined by the boom length direction and a vertical direction.

18. The boom section of claim 13, further comprising a first end cap coupled to and extending over ends of the first and second upper beams and first and second lower beams, the first end cap including at least a first coupling flange and at least a second coupling flange arranged symmetrically to each other with respect to the plane defined by the boom length direction and a vertical direction.

* * * * *